No. 831,171. PATENTED SEPT. 18, 1906.
W. P. MacARTOR.
HARNESS ATTACHMENT.
APPLICATION FILED FEB. 17, 1905.
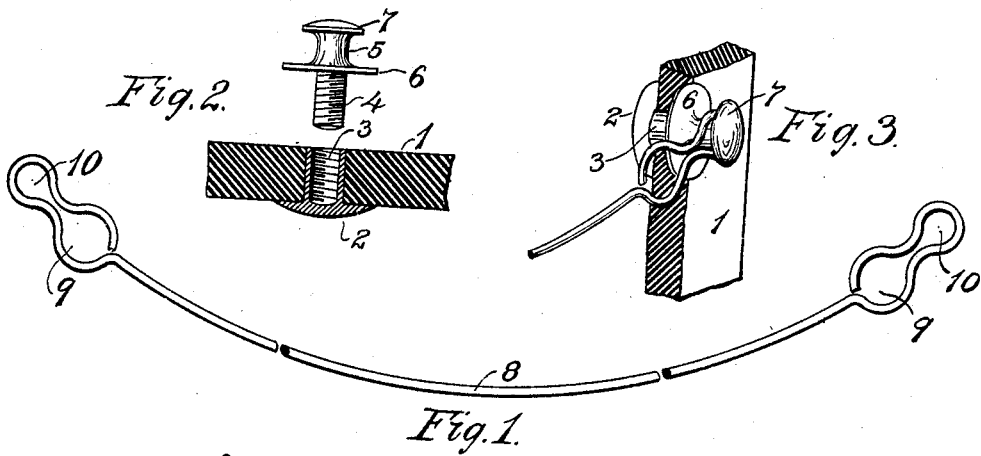
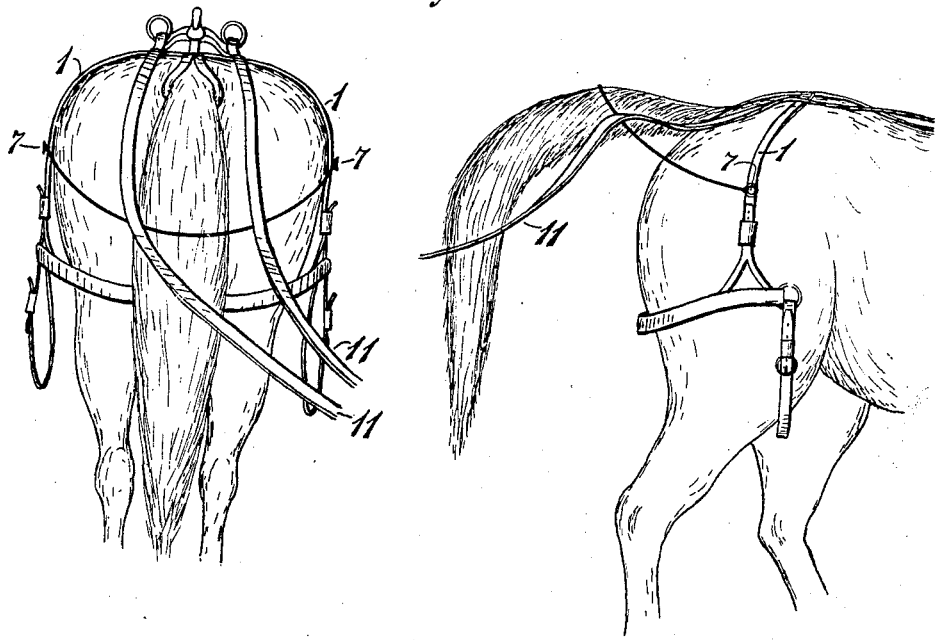
Witnesses.
Linnaeus H. Westcott.
Mignon Ford.
Inventor.
William P. MacArtor
By Stephen Rogers
Attorney.

UNITED STATES PATENT OFFICE.

WILLIAM P. MacARTOR, OF LOS ANGELES, CALIFORNIA, ASSIGNOR OF ONE-HALF TO A. VICTOR SEGNO, OF LOS ANGELES, CALIFORNIA.

HARNESS ATTACHMENT.

No. 831,171.     Specification of Letters Patent.     Patented Sept. 18, 1906.

Application filed February 17, 1905. Serial No. 246,188.

*To all whom it may concern:*

Be it known that I, WILLIAM P. MACARTOR, a citizen of the United States, residing at Los Angeles, in the county of Los Angeles and State of California, have invented certain new and useful Improvements in Harness Attachments; and I do hereby declare the following to be a full, clear, and exact description of the invention, such as will enable others skilled in the art to which it appertains to make and use the same.

This invention relates to harness for draft-animals, and particularly to attachments or harness of carriage-animals; and some of the objects of the invention are to provide a device of this character which will be simple and cheap in construction, while being efficient for the purpose intended.

Another object of the invention is to provide a device constructed to prevent the reins from engagement with the tail of the horse, and to provide such a device so constructed as to be capable of ready attachment and detachment from the harness, and one that will not interfere with the movement of the tail of the animal or cause annoyance thereto.

With these and other objects in view the invention consists, essentially, in the construction, combination, and arrangement of parts, substantially as more fully described in the following specification and as illustrated in the accompanying drawings, forming part of this application, in which—

Figure 1 is a detail view, partly broken away, of the attachment. Fig. 2 is a detail view, partly in section, of the securing devices. Fig. 3 is a detail fragmental view showing one end of the attachment in position. Fig. 4 is a rear view of an animal, showing the attachment in position; and Fig. 5 is a side view of the same, illustrating the action of the attachment.

Similar characters of reference designate corresponding parts throughout the several views.

Referring to the drawings, reference character 1 designates the hip-straps of an ordinary vehicle-harness, to which straps, preferably in the openings therein for the tongue of the buckle of the breech, is removably secured member or portion 2 of a securing device, which member is preferably provided with an interiorly-threaded tubular extension 3, constructed to receive the exteriorly-threaded extension 4 upon the other member 5 of the securing device, which latter member is preferably provided with an annular flange or rim 6 and a head or knob 7, substantially as shown in detail in Figs. 2 and 3 of the drawings. By means of this construction the attachment can be readily secured in position by securing the same in any of the holes of the hip-straps 1, or, if necessary, additional holes may be formed therein for the reception of the securing device, which can be readily placed in position by inserting the member 2 into such hole in the hip-straps and screwing the member 5 into the member 3, thus affording means for securing the attachment to hip-straps of various thickness, as will be readily understood. A belt or rod 8, of any preferred construction or material, is preferably provided with double spring-eyes 9 and 10, the former being adapted to be placed over the knob 7 and forced into the eye or loop 10, as shown in Figs. 3, 4, and 5 of the drawings. Thus it will be seen that the securing devices may be easily secured in position on the hip-straps and the belt or rod 8 may be quickly placed thereon, so as to afford free movement of the belt or rod 8 throughout the movement of the tail of the animal, while the reins 11 will be prevented from engagement with the tail of the animal, as shown in Figs. 4 and 5.

The operation of this invention will be readily understood from the foregoing description, when taken in connection with the accompanying drawings, and further explanation thereof will not be required.

It is not desired to limit or confine this invention to the specific construction, combination, and arrangement of parts herein shown and described, and the right is reserved to make all such changes in and modifications of the same as come within the spirit and scope of this invention.

I claim—

An attachment provided with a female portion, a male portion constructed to removably engage the same upon the hip-strap of a harness and having an extension and a bail having a portion adapted to removably engage said extension to prevent the engagement of the reins with the tail of the animal.

5. In testimony whereof I have signed my name to this specification, in the presence of two subscribing witnesses, at Los Angeles, county of Los Angeles, State of California, this 9th day of February, 1905.

WILLIAM P. MacARTOR.

Witnesses:
CHARLES S. ROGERS,
MIGNON FORD.